US005218579A

United States Patent [19]

Tomioka et al.

[11] Patent Number: 5,218,579

[45] Date of Patent: Jun. 8, 1993

[54] NUMERICAL VALUE SETTING DEVICE

[75] Inventors: Kiyotaka Tomioka; Hiroyuki Yamamoto; Hideaki Tanaka, all of Kyoto, Japan

[73] Assignee: Omron Tateisi Electronics Co., Kyoto, Japan

[21] Appl. No.: 428,308

[22] Filed: Oct. 30, 1989

[30] Foreign Application Priority Data

Oct. 28, 1988 [JP] Japan .................................. 63-272460

[51] Int. Cl.[5] .......................... G04C 9/00; G08B 1/00; G05B 11/01

[52] U.S. Cl. .............................. 368/187; 340/309.15; 364/143; 364/146

[58] Field of Search .......................... 368/10.69-10.70, 368/185-187, 319-321; 340/309.15-309.4; 364/141-146

[56] References Cited

U.S. PATENT DOCUMENTS 4,267,762 5/1981 Aoki et al. .......................... 84/1.03

4,893,230 1/1990 Shimomura et al. ............... 364/146

FOREIGN PATENT DOCUMENTS 0066532 12/1982 European Pat. Off. .

3335219 4/1985 Fed. Rep. of Germany .

2188749 10/1987 United Kingdom .

OTHER PUBLICATIONS

Patent Abstracts of Japan, vol. 10, No. 229, (P-485) (2285), Mar. 31, 1986, (Matsushita Electric Ind. Co., Ltd.).

Patent Abstracts of Japan, vol. 7, No. 220 (P-226) Jul. 6, 1983, (Matsushita Denki Sagyo KK).

Design Concept for a Microprocessor-Based Temperature Controller, T. Rolls et al., 2407 Microprocessors and Microsystems, vol. 6 (1982) Jun. No. 5, Whitstable, Kent, Great Britain, pp. 225-233.

*Primary Examiner*—Vit W. Miska

*Attorney, Agent, or Firm*—Foley & Lardner

[57] ABSTRACT

A numerical value setting device which accomplishes a numberical value setting or registering operation whether a power supply is interrupted or restored during its operation has a set value registering timer. The set value registering timer defines a period at the end of which the set value is registered. The set value registering timer counts different period clock pulses depending on the states of the power supply to assure that the correct numerical value is registered.

8 Claims, 7 Drawing Sheets

NUMERICAL VALUE SETTING DEVICE

BACKGROUND OF THE INVENTION

1. Field of the Invention

This invention relates to an electronic numerical value setting device which can set numerical values regardless of its connection to or disconnection from an electric power source.

2. Related Art

A conventional electronic numerical value setting device exists in which a numerical value may be set by a keying operation whether or not the device is connected to an electric power source. The numerical value thus set is automatically registered by the device for a predetermined period of time after the keying operation.

However, this conventional electronic numerical value setting device has several disadvantages. The power supply may be interrupted or restored during the keying operation, or during an automatic registering latency time. The automatic registering latency time is that period of time which elapses between the completion of a keying operation and the registering of the numerical value. Power supply interruption during the keying operation or the latency time results in setting an incomplete numerical value. Since the incomplete numerical value set is different from the intended numerical value, erroneous operation of the system results.

In addition, it is also possible that numerical data is registered during the latency time which elapses from the instant that the keying operation is ended until the desired numerical value is automatically registered. The value registered during the latency period before the time instant at which automatic registering normally occurs cannot be easily corrected. Accordingly the setting of the numerical value must be carried out again. This is rather troublesome for an operator.

SUMMARY AND OBJECTS OF THE INVENTION

Accordingly, it is an object of the invention to eliminate the above-described difficulties accompanying a conventional numerical value setting device. More specifically, an object of the invention is to provide a numerical value setting device in which, if the power supply is interrupted or restored during a numerical value setting operation, the numerical value being keyed will not be registered and the keying operation is not adversely affected. When the power supply is interrupted or restored during the automatic registering latency time, the numerical value set is registered after a lapse of the remaining latency time, that is, at the automatic registering time.

The foregoing objects of the invention have been achieved by the provision of the numerical value setting device which sets a numerical value whether or not electric power is supplied thereto, and has means for preventing the setting of a numerical value, or registering of the numerical value set. The device further prevents adverse effects on the time of registering the numerical value when an electric power supply to the device is interrupted or restored.

That is, the numerical value setting device of the invention is so designed that the operation of setting a numerical value, the operation of registering the value set, and the automatic set value registering time are not affected even when the electric power supply condition is changed. Even if the electric power supply is interrupted or restored while setting a numerical value, a numerical value which has not been completely set will not be registered, and the true value can be set later as usual. Hence, the device will not incorrectly register a numerical value other than the desired numerical value. Furthermore, even if the electric power supply to the device is suspended or restored during the automatic registering latency time, which occurs after the keying operation for setting a numerical value, the set value can be corrected during that automatic registering latency time. Thus, the numerical value setting device of the invention has practical use.

BRIEF DESCRIPTION OF THE DRAWINGS

FIG. 6 shows the display of the present count (3000) and a zero suppressed preset value (2500).

FIG. 7 shows the display of a flickering place of the present value.

FIG. 8 shows the operation of the shift key.

FIG. 9 shows the operation of the up key.

FIG. 10 shows display of the present count and present value when the number of stages is one.

DETAILED DESCRIPTION OF THE PREFERRED EMBODIMENTS

The preferred embodiment of this invention will be described with reference to the accompanying drawings.

Figure 1:
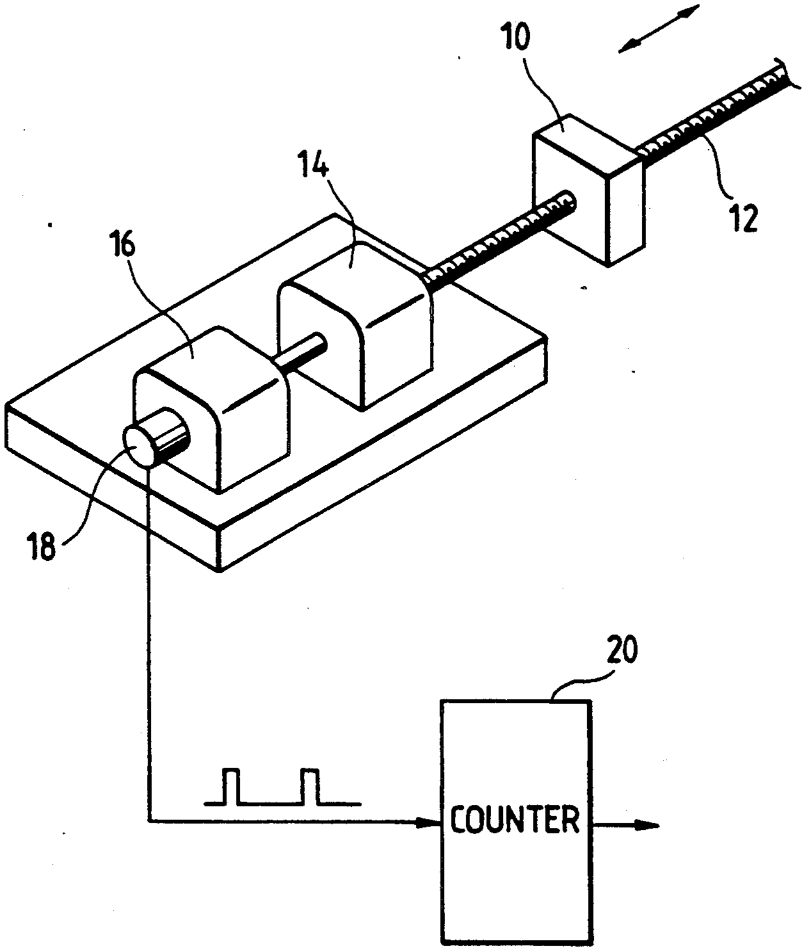
FIG. 1 is a diagram showing one example of the use of the preferred embodiment of the invention.

As one application of the invention, and not by way of limitation, FIG. 1 shows that a slider 10 is moved back and forth as a ball screw 12 rotates. The ball screw 12 is rotated through a speed reducer 14 by an electric motor 16. The electric motor 16 is provided with a rotary encoder 18. The output pulse of the rotary encoder 18 is applied to a counter 20 to which the technical concept of the invention is applied.

Figure 2:
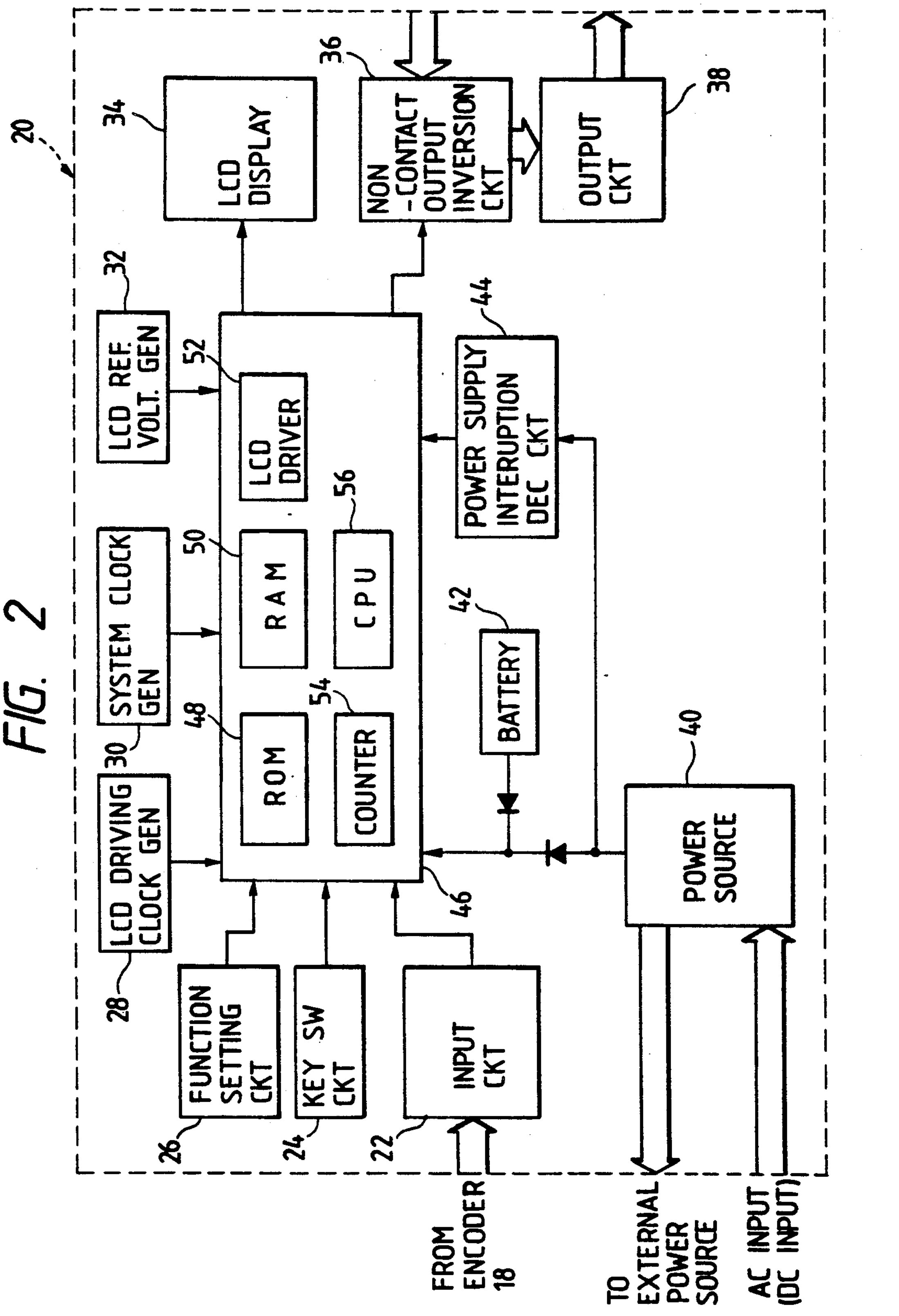
FIG. 2 is a block diagram showing the arrangement of the counter shown in FIG. 1.

As shown in FIG. 2, the counter 20, has an input circuit 22 to which the encoder 18 can be connected, a key switch circuit 24, a function setting circuit 26, an LCD driving clock generating circuit 28, a system clock generating circuit 30, an LCD reference voltage generating circuit 32, an LCD display unit 34, a non-contact output inversion circuit 36, an output circuit 38, a power source circuit 40, a battery 42, serving as an auxiliary power source for supplying the electric power when the ordinary power source is interrupted, a power supply interruption detecting circuit 44, and a data processing circuit 46. The data processing circuit 46 has a ROM 48, a RAM 50, an LCD driver 52, a counter circuit 54, and a CPU 56.

When the count value of the output pulses of the encoder 18, which are applied to the input circuit 22, coincides with a value preset by a key sequence, the output circuit 38 supplies a coincidence signal to a control circuit (not shown). A switching signal provided by an output inversion switch (not shown) is applied to the non-contact output inversion circuit 36.

Figure 3:
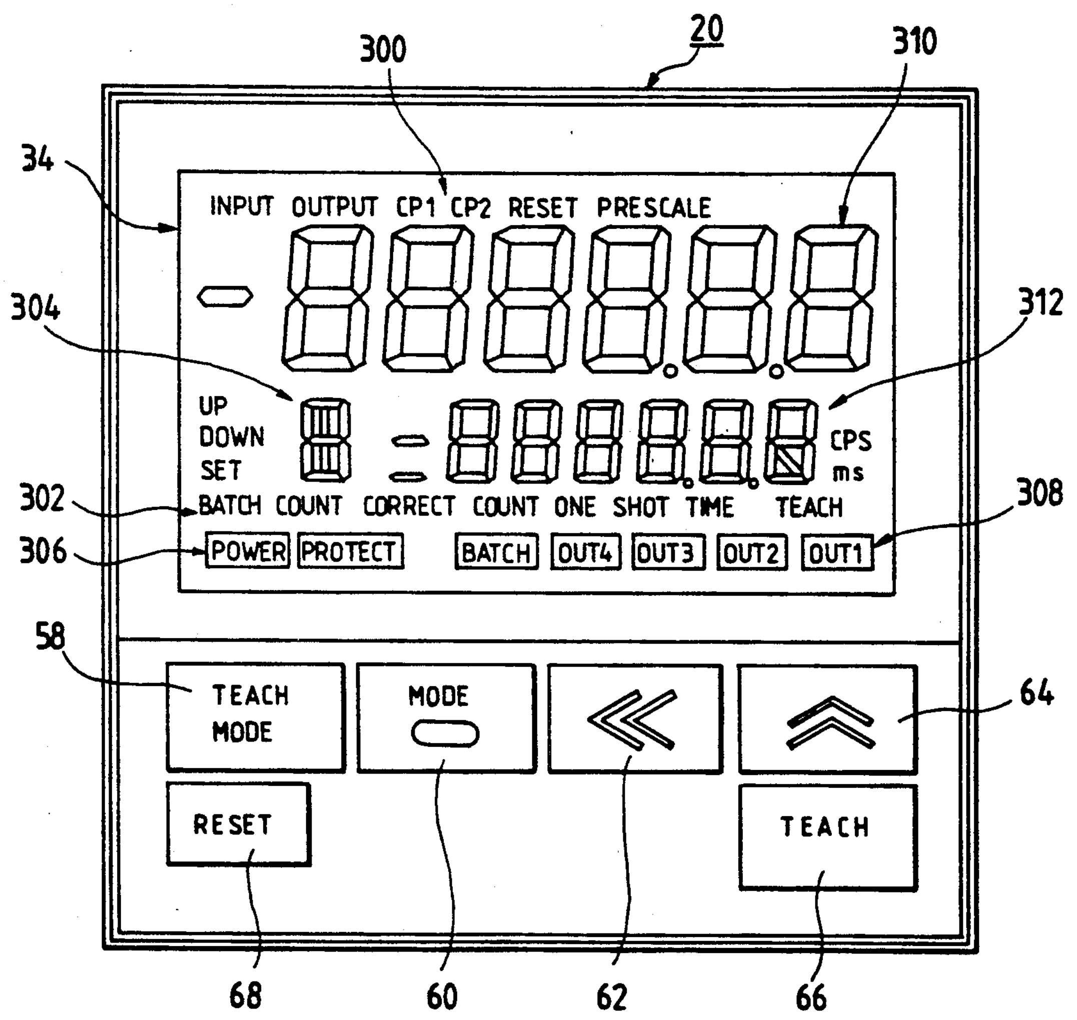
FIG. 3 is a diagram of the front panel of the counter shown in FIG. 1.

FIG. 3 shows the front panel of the counter 20. The LCD display 34, a teach mode key 58, a mode key 60, a shift key 62, an up key 64, a teach key 66, and a reset key 68 are provided on the front panel of counter 20.

The LCD display unit 34 has mode displays 300, 302, and 304 displaying a number of stages of a preset value, and input and output modes. A "power on" display is indicated at 306. A control output display is indicated at 308. A count value display is indicated at 310 to display a current count value with zero suppression. A preset value display is indicated at 312 to display the contents of an operation mode when set.

Figure 4:
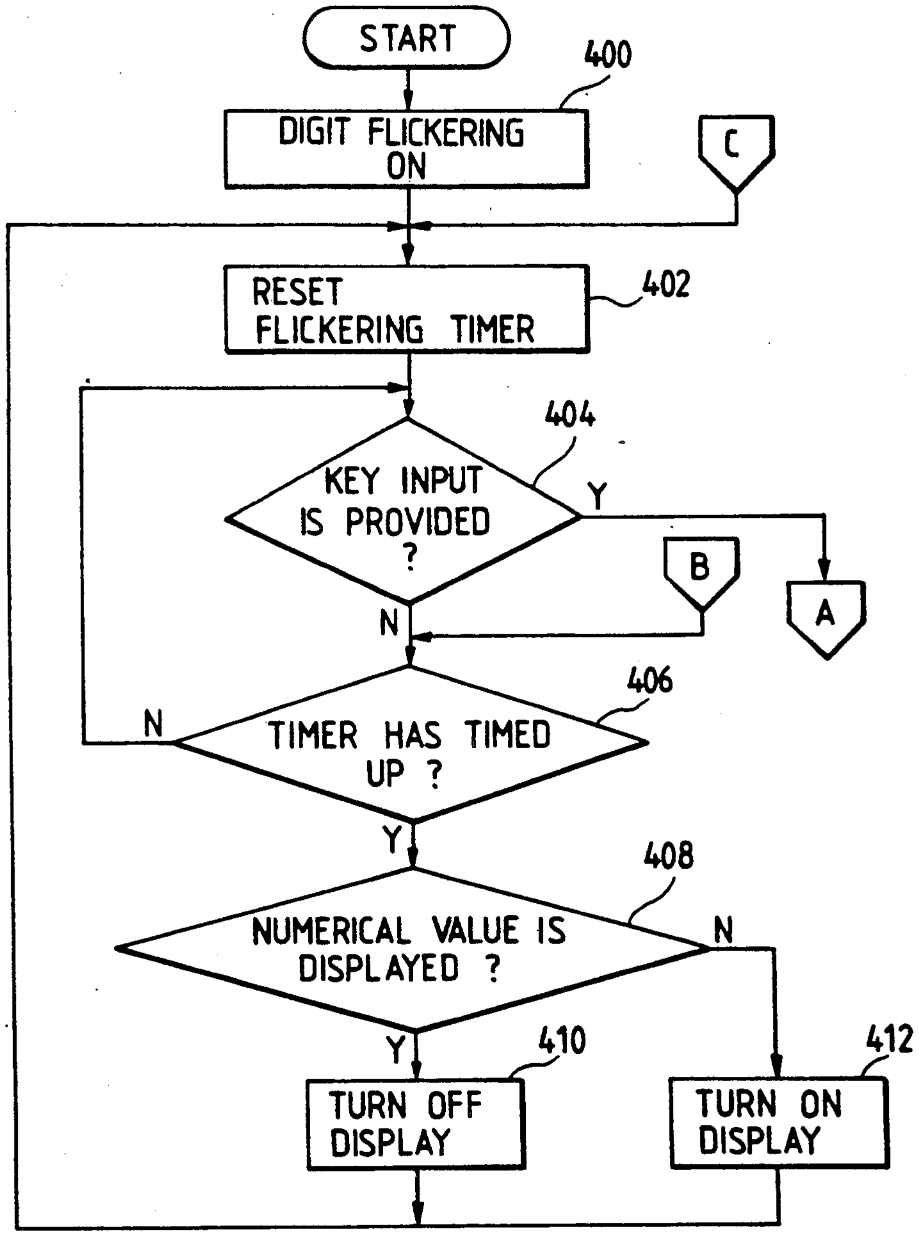
FIGS. 4 and 5 are flow charts describing the operation of an embodiment of the invention.
Figure 5:
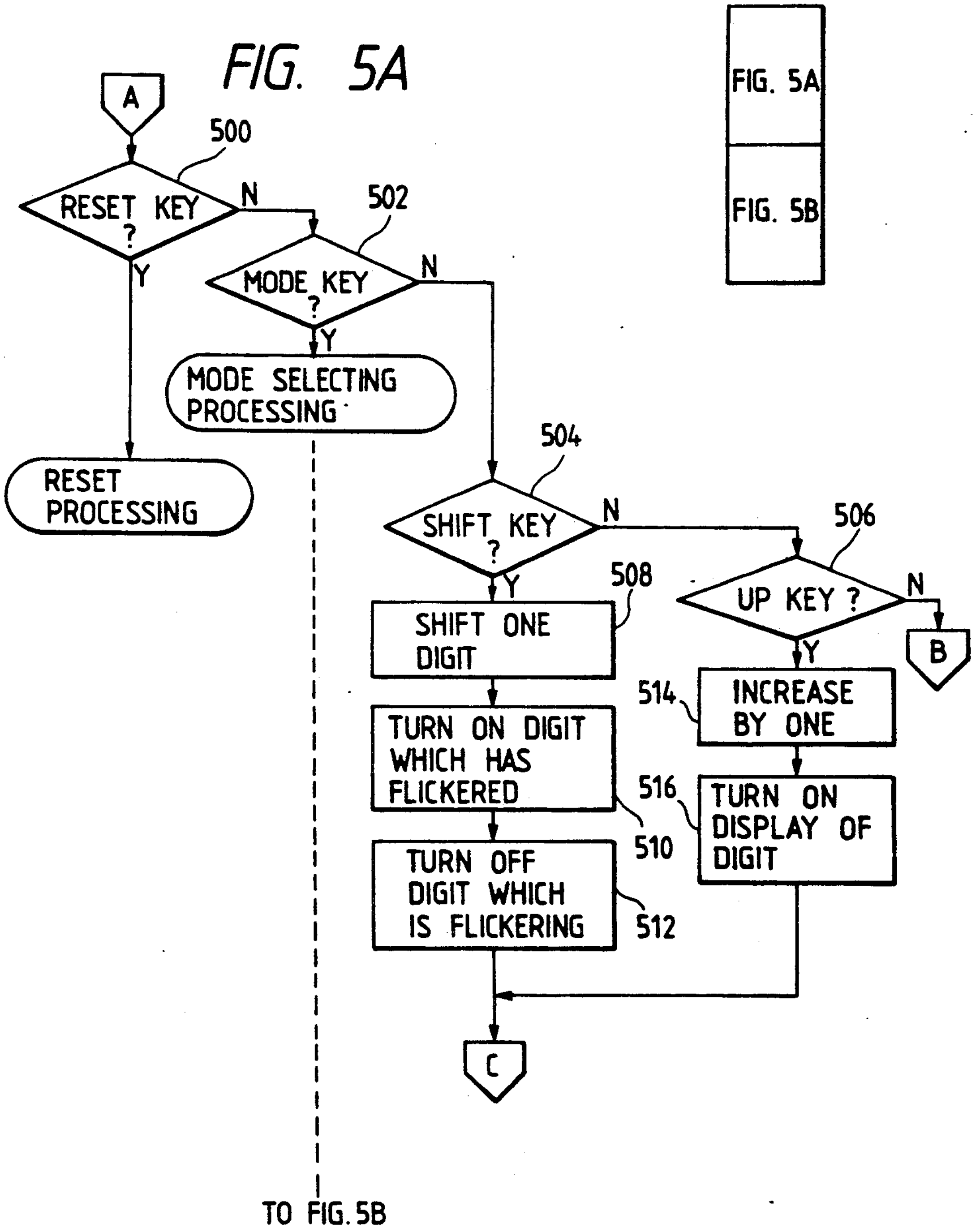
Figure 5B:
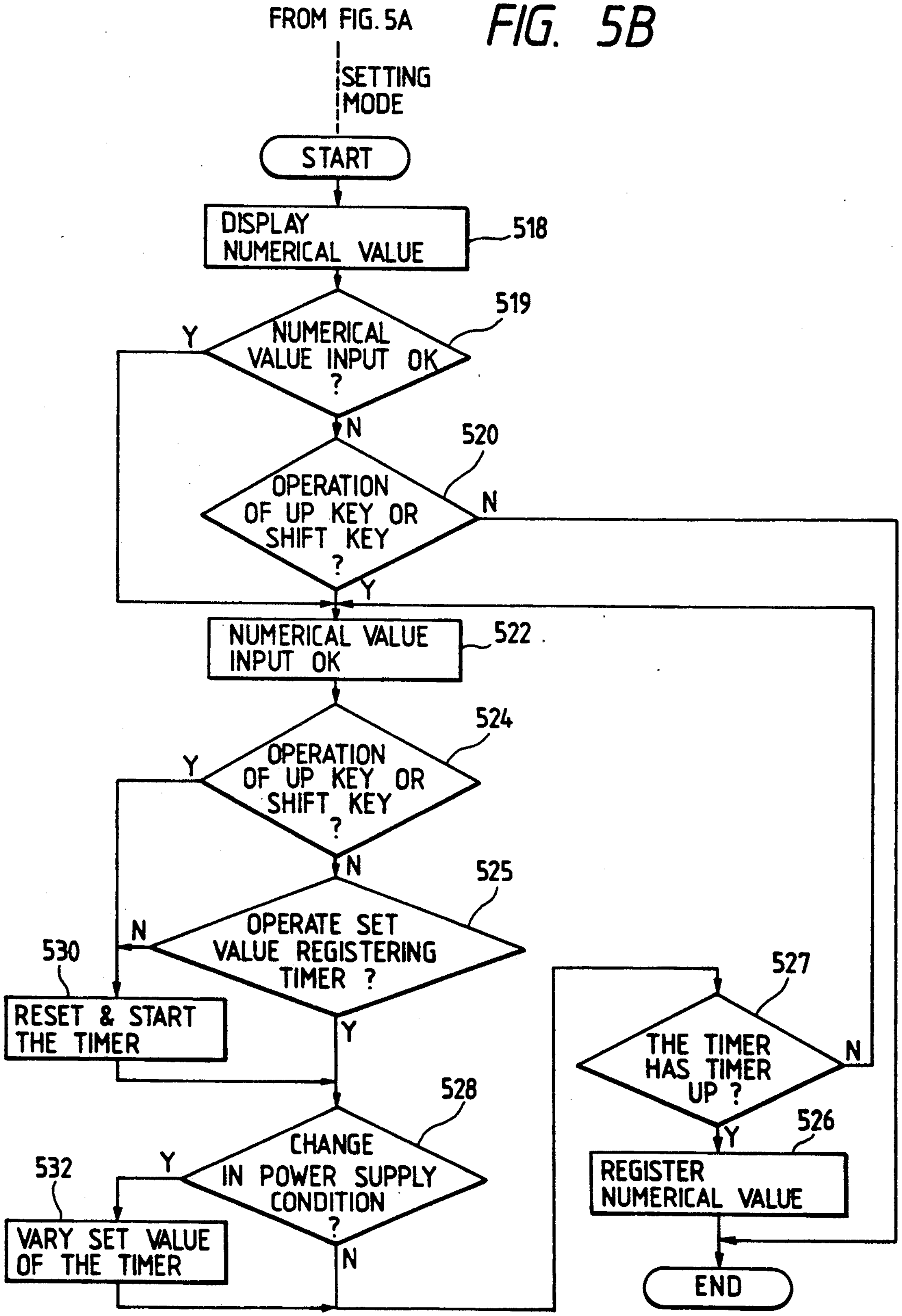

FIGS. 4 and 5 are flow charts describing the operation of the embodiment of the invention. In Step 400, a digit of a numerical value begins flickering, and then a flickering timer is reset in Step 402. In Step 404 it is detected whether or not a key input is provided.

If no key input is detected, in Step 406 it is determined whether or not the flickering timer reset in Step 402 has timed out. If the flickering timer has not yet timed out, Step 404 is repeated. Otherwise Step 408 is activated.

Step 408, detects whether or not a numerical value is being displayed. If "yes", the display of the numerical value is stopped in Step 410; and if "no", the display of the numerical value is carried out again in Step 412. In each case, Step 402 is effected again, resetting the flickering timer. Thus, on the LCD display unit 34, the display of the numerical value at the designated place flickers for a predetermined period of about one second.

If in Step 404 a key is detected, then in Step 500 it is determined whether or not the operation key detected is the reset key 68. If "yes", a reset operation is carried out. If "no", in Step 502 it is next determined whether or not the operation key is the mode key 60. If "no", in Step 504 it is determined whether or not the operation key is the shift key 62. If "yes" a shifting operation described below is performed. If "no", it is determined in Step 506 whether or not the operation key is the up key 64. If it is determined that all these keys are not operated, Step 406 is carried out again. If either the shift or up key is operated, control is returned to Step 402 upon completion of the corresponding operation.

Figure 6:
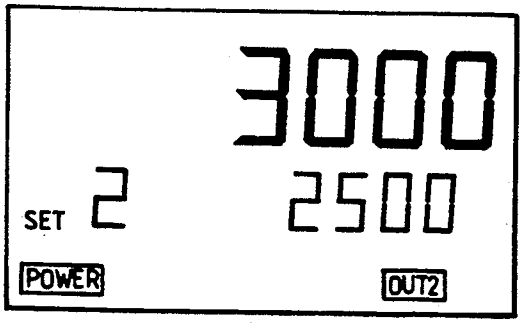
FIGS. 6 through 10 are explanatory diagrams which describe the operation of the embodiment of the invention.

Operation of the mode key 60, causes selecting the stage number for a preset value. FIG. 6 shows an example of a display when the operation causes setting a preset value at the second stage. The present count, "3000", is displayed (Step 518), and a preset value "2500" is displayed being zero-suppressed.

Figure 7:
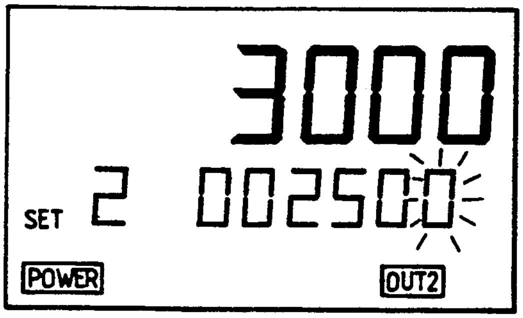

When, under this condition, the shift key 62 or the up key 64 is operated (Step 520), a numerical value can be set (Step 522), so that the display of the least significant digit "0" of the preset value is flickered, as shown in FIG. 7.

Figure 8:
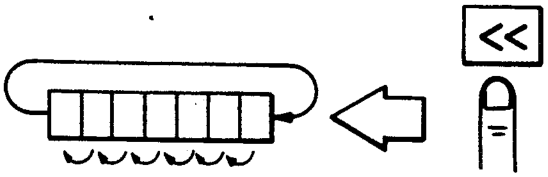

The location of the flickering is shifted as shown in FIG. 8 each time the shift key 62 is operated (Step 508). The previously flickering digit is displayed continuously (Step 510). The display of the digit at the new flickering location is then forcibly stopped in Step 512, and Step 402 which initiates a flickering timer (FIG. 4) is carried out again.

Figure 9:
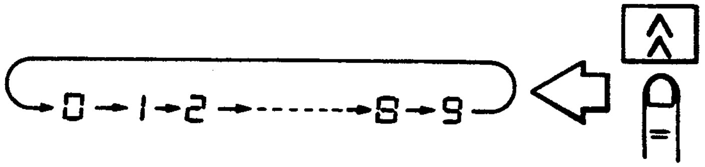

On the other hand each time the up key 64 is operated, the numerical value at the flickering location is incremented consecutively (Step 514), as shown in FIG. 9, the incremented digit at the new flickering location is displayed at each time of pressing the up key 64 (Step 516).

Thus, when the movement of the flickering location is indicated by operating the shift key 62, the display of the digit at the place to be changed is stopped temporarily (Steps 512, 402, 408, 410 and 412).

Therefore, the place to be changed can be readily detected, and the set value (preset value) can be quickly and readily changed by operating the up key 64. When the change is accepted in Step 524, the set value is registered (Step 526).

Figure 10:
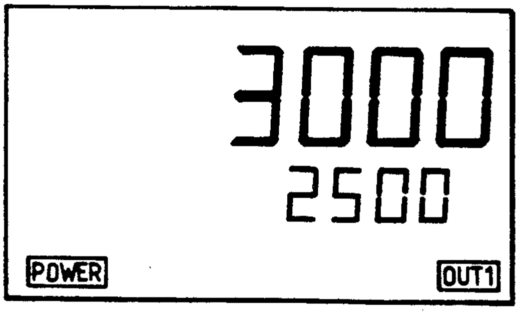

In the case where the number of stages is one that is at the first stage, the number of stages of a preset value is not displayed as shown in FIG. 10.

The above-described operation is applicable not only to a numerical value such as a preset value but also to other set parameters.

During a numerical value setting operation with the up key 64 or the shift key 62, or when the keying operation is ended (Step 524), a set value registering timer is started (Step 530) to run for a predetermined period of time. Thus, at the lapse of the time set in the set value registering timer, the set value is automatically registered.

The specific feature of the numerical value setting device according to the invention resides in that, when the power supply is interrupted or restored during the numerical value setting operation or during the automatic registering latency time, the device is not already affected. That is, the device can achieve the numerical value setting operation and the set value registering operation satisfactorily, as described below.

In the numerical value setting device of the invention, the CPU operating clock frequency is changed depending on whether or not the power supply is interrupted because power consumption varies in proportion to the variations in the clock frequency. In an ordinary state, the clock frequency is about several MHZ whereas it is about 100 KH2 when the battery is employed on behalf of the ordinary power supply. When the power supply is interrupted or restored during operation of the set value registering timer; i.e., before the set value is registered, as in Step 528, it is necessary to change the value set in the set value registering timer separately according to the states of the power supply (Step 532).

A procedure for changing the value set in the set value registering timer is described below.

In the numerical value setting device of the invention, the automatic registering latency time is previously set to 5 sec. in the set value registering timer by the manufacturer.

When the electrical power is supplied to the device, clock pulses counted by the set value registering timer have a clock period of 5 ms. Therefore, counting 1000 clock pulses reaches 5 sec. When the electric power supply to the device is interrupted, the clock pulses counted by the set value registering timer have a clock period of 60 ms. Thus, when the electric power supply to the device is interrupted, counting 83 clock pulses reaches 5 sec. It should be noted that when electric power is interrupted, the circuits of the device can be powered by battery 42.

Consider the case where the electric power supply is maintained unchanged and then interrupted. Assume while the electric power supply to the device is maintained unchanged, and the electric power supply to the device is interrupted when two seconds is counted by the set value registering timer. Beginning at this time it is necessary to operate a set value registering timer to input 60 ms period clock pulses (Step 525) for the case where the electric power supply to the device is interrupted. For this purpose, in Step 532 the number of clock pulses, that is the number of interruptions used for counting the registering latency time, which is set in the set value registering timer when the electric power supply is interrupted is calculated. First, in order to detect the remaining three seconds, the following arithmetic operation is carried out:

Remaining time=5 sec. −[(count number of clock pulses counted during electric power)×5 ms] The calculation will result in 3 seconds (Step 527).

Next, the count value X, that is, the number of clock value pulses counted by the set value registering timer when the electric power supply to the device is interrupted is obtained as follows:

$$X=(\text{remaining time})\times 1/60\ ms$$

The value X=50 is thus obtained and newly set in the set value registering timer. As previously noted the 60 ms period clock pulses are used when the electric power supply to the device is interrupted, e.g. after 2 seconds of maintained electric power, as in the present example.

In the case where the electric power supply to the device is restored, the operation is carried out in the same but a reverse manner. Thus, the operation in Step 532 has been accomplished.

That is, in the device of the invention, when the up key operation or shift key operation is accomplished under the normal condition ("yes" in Step 524), the set value registering timer starts (Step 530), and at the end of predetermined period of time (the automatic registering latency period) the set value is automatically registered (526).

On the other hand, in the case where, during or after the above-described key operation, the set value registering timer starts, and the electric power supply condition is changed ("yes" in Step 528), a count value set in the set value registering timer is changed, and a new count value (to count, for example, three seconds as in the above-described case) is newly set in the timer. Therefore, even when the electric power supply to the device is interrupted, the desired set value can be correctly registered. Even if the electric power supply to the device is interrupted during the automatic registering latency time after the key operation has been accomplished for setting a numerical value, the set value is automatically registered at the end of the predetermined latency time as usual, and therefore the set value can be corrected during the automatic registering latency time.

As was described above, even when the electric power supply to the numerical value setting device is interrupted or restored during the numerical value setting operation or the automatic registering latency time, the device is not affected thereby; that is, it can register the set value in the same manner at all times.

What is claimed is:

1. A method of setting numerical values on a device having means for setting said values comprising the steps of:
   - setting an automatic registering latency time in said device;
   - setting a counter to achieve a timer operating at a first repetition rate in a presence of electric power and a second repetition rate in an absence of electric power;
   - counting with said timer a number of repetitions from a time of setting a desired numerical value to an end of said latency time; and
   - registering said desired numerical value at said end of said latency time.

2. The method recited in claim 1, wherein the step of registering said desired numerical value comprises detecting said end of said latency time with said timer.

3. The method recited in claim 1, further including the step of setting said automatic registering latency time to a constant value.

4. The method recited in claim 1 further including the step of maintaining said latency time constant.

5. The method, recited in claim 1 further comprising the steps of:
   - calculating an elapsed time from a number of counts at said counter at one of the repetition rates in a first power supply condition, said condition being one of said presence and absence of electric power;
   - detecting a second power supply condition;
   - subtracting said elapsed time from said automatic registering latency time to define a remaining time; and
   - dividing said remaining time by the other of said repetition rates to determine a number of counts required to arrive at the end of said latency time at said other repetition rate.

6. An apparatus for setting numerical values comprising:
   - input means for receiving numerical values to be set;
   - means for setting an automatic registering latency time;
   - means for detecting a presence and absence of an electric power supply;
   - means for setting a first repetition rate in the presence of electric power and a second repetition rate in the absence of electric power;
   - means for counting a number of repetitions from a time of setting a desired numerical value to an end of said latency time;
   - means for registering said numerical values at the end of said latency time; and
   - means for displaying said numerical values.

7. The apparatus recited in claim 6, further comprising means for setting said automatic registering latency time to a constant value.

8. The apparatus recited in claim 6, further comprising:
   - means for calculating an elapsed time from a number of counts at one of the rates in a first power supply condition, said condition being one of said presence and absence of electric power;
   - means for subtracting the elapsed time from said automatic registering latency time to define a remaining time in a second power supply condition; and
   - means for multiplying said remaining time by the other of said repetition rates to detect a number of counts required to arrive at the end of said latency time at said other repetition rate.

* * * * *